United States Patent [19]

Biddick et al.

[11] 4,098,967
[45] Jul. 4, 1978

[54] ELECTROCHEMICAL SYSTEM USING CONDUCTIVE PLASTIC

[75] Inventors: Royce E. Biddick, Edina; Richard J. Rubischko, Minnetonka, both of Minn.

[73] Assignee: Gould Inc., Rolling Meadows, Ill.

[21] Appl. No.: 542,211

[22] Filed: Jan. 20, 1975

Related U.S. Application Data

[62] Division of Ser. No. 363,254, May 23, 1973, abandoned.

[51] Int. Cl.² .............................................. H01M 6/48
[52] U.S. Cl. .................................. 429/210; 429/234; 429/245
[58] Field of Search ................................ 136/10–12, 136/120, 121, 22, 36, 37, 38, 49, 64, 65, 26, 7; 429/210, 234, 245, 225–228

[56] References Cited

U.S. PATENT DOCUMENTS

| | | | |
|---|---|---|---|
| 2,654,794 | 10/1953 | Zaugg | 136/7 |
| 3,202,545 | 8/1965 | Emeriat | 136/38 |
| 3,269,863 | 8/1966 | Helms | 136/37 X |
| 3,466,193 | 9/1969 | Hughel | 136/26 |
| 3,565,694 | 2/1971 | Chireau | 136/121 |
| 3,573,122 | 3/1971 | Olstowski et al. | 136/121 |
| 3,607,412 | 9/1971 | Holloway | 136/36 X |
| 3,690,950 | 9/1972 | Wheadon et al. | 136/37 |
| 3,738,871 | 6/1973 | Scholle | 136/137 X |
| 3,795,543 | 3/1974 | Pol | 136/10 |
| 3,817,788 | 6/1974 | Eckerbonn et al. | 136/10 |
| 3,819,412 | 6/1974 | Taylor et al. | 136/10 |

*Primary Examiner*—Charles F. LeFevour
*Attorney, Agent, or Firm*—Leydig, Voit, Osann, Mayer & Holt, Ltd.

[57] ABSTRACT

In a conductor-electrolyte-active material electrochemical environment, the conductor is protected against corrosion by that portion of the conductor in contact with the electrolyte and active material being formed of plastic filled with vitreous carbon. Adequate conductivity is obtained by finely dividing the vitreous carbon and loading the plastic with 40%–80% carbon by volume. The filled plastic is particularly effective as a bipolar plate substrate. A layer of lead-antimony foil bonded to the carbon-filled plastic provides a good surface for adhering active materials. A lead sheet can be bonded to the substrate to define a low resistance terminal. Forming the edges of the substrate of thicker sections of unfilled — hence nonconductive — plastic allows the plates to be stacked to define a battery.

12 Claims, 3 Drawing Figures

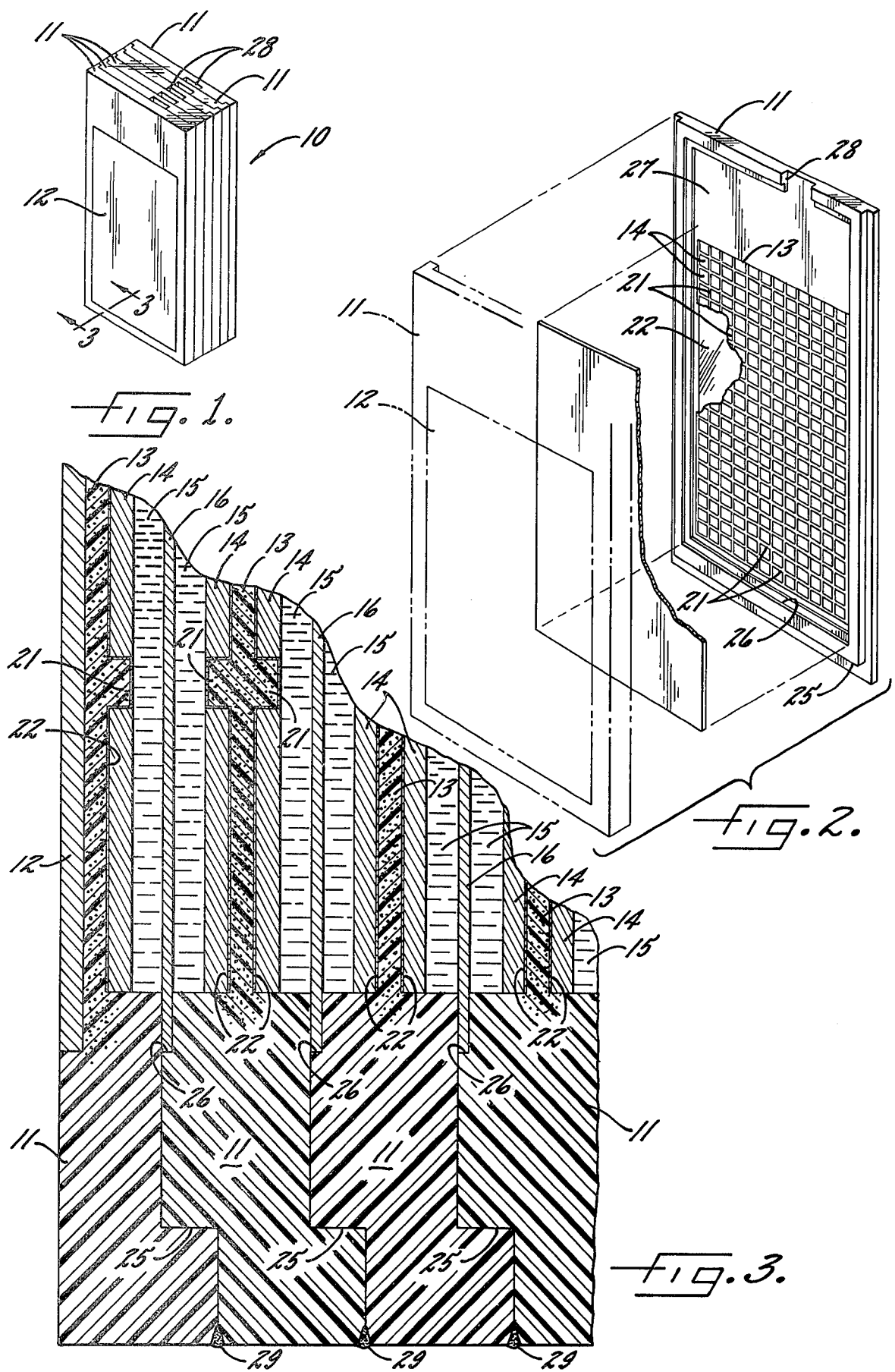

ELECTROCHEMICAL SYSTEM USING CONDUCTIVE PLASTIC

Portions of the invention described herein were made in the course of, or under, a contract with the Department of Health, Education & Welfare.

This is a division of application Ser. No. 363,254, filed May 23, 1973, now abandoned.

This invention relates generally to electrochemical systems involving a conductor, electrolyte and active material environment in which the conductor is formed, at least in part, of electrically conductive plastic, and more particularly the invention concerns a novel conductive plastic material for such applications.

It has been recognized that a bipolar plate in a secondary battery gives the battery very low intercell resistance so that the battery can operate at high power densities. However, in a lead-acid battery system, the substrate for the bipolar plate is subject to very demanding conditions and the advantages of a bipolar plate can be lost due to material failure. An effective lead-acid bipolar plate substrate must have the mechanical strength to support the active materials, must be both impervious and resistant to the acid electrolyte, must be very resistant to corrosion — particularly with respect to the highly oxidating conditions existing at the positive side of the plate, and must obviously be electrically conductive.

A primary aim of this invention is to provide a conductive plastic material for electrochemical systems capable of performing well as a lead-acid bipolar plate substrate.

Another object of the invention is to provide a plate substrate of the above character made to facilitate a low resistance, tightly adhering interface between the active materials and the substrate.

It is also an object to provide a plate as described above which is adapted to be joined with other similar plates to define a compact battery, including the battery container.

A further object is to provide a plate and battery of the above kind which has a large integral terminal area for efficiently drawing power from the battery.

Other objects and advantages of the invention will become apparent upon reading the following detailed description and upon reference to the drawings, in which:

FIG. 1 is a perspective of a battery utilizing plates constructed in accordance with the present invention;

FIG. 2 is an enlarged perspective of one of the plates making up the battery of FIG. 1; and FIG. 3 is a greatly enlarged fragmentary section taken approximately along the line 3—3 in FIG. 1.

While the invention will be described in connection with a preferred embodiment, it will be understood that we do not intend to limit that invention to that embodiment. On the contrary, we intend to cover all alternatives, modifications and equivalents as may be included within the spirit and scope of the invention as defined by the appended claims.

Turning first to FIG. 1, there is shown a battery 10 made up of plates 11 embodying the invention. Six plates 11 are stacked to define five cells for the battery 10, the middle four plates being identical and the two end plates differing only in defining terminals 12, only one of which is shown.

The illustrated battery 10 is of the lead-acid type with the plates 11 being bipolar. As shown in FIGS. 2 and 3, each plate 11 defines a substrate 13 supporting, on opposite sides, positive and negative active materials 14. Between the active materials 14 of two adjacent plates, two regions of electrolyte 15 are divided by an ion-pervious separator 16.

In accordance with the invention, the substrate 13 is formed of plastic filled with finely divided vitreous carbon in a proportion of from 40% to 80% carbon by volume so as to define a non-corrosive, liquid-impervious, conductive base or substrate for the active materials 14. Vitreous carbon, sometimes called glassy carbon, is a very hard, amorphous, chemically inert form of carbon that, when finely divided, gives the appearance of black ground glass. The conductivity of vitreous carbon is substantially less than carbon black or carbon in graphite form, and hence relatively heavy filling or loading is necessary to achieve a plate of suitably low resistance. It has been found that better conductivity results are obtained if the carbon is a mixture of particles sized from submicron up to −60 mesh. A commercial form of vitreous carbon generally meeting these criteria is supplied as Type 101-A by Beckwith Carbon Corporation.

Any plastic can be used which retains its physical integrity, and desirably its flexibility, when filled over 40% by volume. Thermoplastics are preferable because they are easy to fabricate, and it has been found that plastics having branched chain molecular structure are superior for this application as compared to linear chain plastics. Obviously, for a lead-acid battery system, the plastic used should be resistant to sulfuric acid and inert in the highly oxidizing conditions found at the positive active material side of the system.

It has been found that flurocarbon plastics are suitable with polyvinylidene fluoride being a good choice. A less expensive plastic also giving good results is polyphenylene oxide.

More definitely, good results have been obtained with a polyvinylidene fluoride homopolymer sold by Pennwalt Corp. under the name KYNAR. This material has a specific gravity of 1.75–1.78 (ASTM method D792), a crystalline melting point of 340° F., a volume resistivity of $2 \times 10^{14}$ ohm-cm, and a hardness of 70–80 Shore-D. Similarly, good results were experienced with NORYL-731 polyphenylene oxide marketed by General Electric Co. This plastic has a specific gravity of 1.06 (D792), can be pressure molded at 400°–460° F., has a volume resistivity greater than $10^{16}$ ohm-cm, and a hardness of R119.

Filling of the plastic can be accomplished in any standard and conventional manner. For example, finely divided polyvinylidene fluoride of the kind identified above can be thoroughly mixed with 55% by volume vitreous carbon in particles averaging about −325 mesh, and then set or formed by compression molding at about 420°–450° F. and 1300 psi. The resulting plastic material will have suitable strength, good flexibility, a specific resistance on the order of 0.002 ohm-cm, and, most importantly, be completely inert in a lead-acid electrochemical environment. This conductivity is not only substantially less than the conductivity of the electrolyte itself in a lead-acid system — which may be considered the limiting resistance — but also the substantial conducting areas of a bipolar plate configuration results in a very low absolute internal intercell resistance.

The illustrated plates 11 have their substrate portion 13 formed with a lattice of ribs 21 on each side to better support the active materials 14. Further, active material adherence is greatly improved by bonding a layer of lead-alloy foil 22 to the faces of the plastic substrate. This foil, which can be on the order of only 0.002 inches thick, is preferably bonded to the plastic during compression molding. An alloy of only 0.2% antimony by weight gives superior results as compared to a "pure" lead foil since it appears that the antimony affects the partial bonds of the lead dioxide of the positive active material and a tight oxide layer is formed which protects the foil from corrosion. The foil greatly reduces the electrical resistance between the substrate and the active material, and provides a good adhering surface for the active material.

Each battery terminal 12 is formed by bonding a sheet of lead to the substrate 13 on the end plates opposite the active materials 14. The lead sheets collect current flow throughout the entire area of the active materials and thus provide a low resistance terminal connection.

As a further feature of the invention, the plates 11 are formed with portions bordering the active materials which are unfilled, and hence nonconductive, and which are thicker than the active materials so that the unfilled portions form segments of the battery container when joined with the other plates. In the illustrated battery, the plates are formed with mating stepped edges 25 which interfit and provide a good electrolyte seal. An additional ledge 26 formed in the plates seat and position the separators 16.

Preferably, the plates 11 are somewhat taller than their active material areas so as to define open electrolyte receiving regions 27 which permit the liquid electrolyte level to rise and fall. Notches 28 are formed in the plates 11 to provide electrolyte filling vents. When the battery is assembled, the plates are welded or otherwise bonded along their joining lines 29 and a cover, not shown, can be fitted over the top of the battery so as to close the notch openings 28.

For larger industrial sized batteries, it is contemplated that the plastic substrate be formed in two parallel layers — that layer supporting the positive active materials being formed of vitreous carbon filled plastic as described above and an adjacent layer being filled with a less expensive form of carbon such as graphite. The combined layers, bonded together in one integral plate, will give the required mechanical strength for large battery plates and corrosion protection at the positive side, but the plate will be less expensive through the use of graphite for obtaining conductivity through the plate to the negative side where corrosion is less of a problem. For added mechanical strength, a sheet metal structure can be embedded in the layered plate.

It can now be seen that there has been provided a flexible plate substrate which is sufficiently conductive and highly resistant to corrosion so as to perform well as a lead-acid bipolar plate. The use of the lead-antimony foil bonded to the plate substrate provides a low resistance, tightly adhering interface between the active materials and the plate substrate. By forming the plates as described above, they can be interjoined to form a complete battery including electrolyte reservoir regions. No special plastics or metal working know-how is required to efficiently produce conductive plastic material embodying the invention.

We claim as our invention:

1. A bipolar electrode-container plate for use in storage batteries comprising, in combination, a planar central substrate surrounded by border portions, said substrate and said border portions being formed of a thermoplastic resistant to electrolyte and capable of being filled, said substrate being filled with electrically conductive material leaving said border portions nonconductive, an active electrode material overlying, supported by and in electrical contact with said substrate within said border portions, a layer of metal foil bonded to said substrate and interposed between said substrate and said active material, and said border portions being proportioned so as to interfit with other similar plates leaving space for separators and electrolyte within the container periphery defined by the border portions.

2. The combination of claim 1 in which said foil layer is a lead-antimony alloy.

3. The combination of claim 2 in which the content of antimony in said alloy is about 0.2% by weight.

4. A bipolar electrode-container plate for use in storage batteries comprising, in combination, a planar central substrate surrounded by border portions, said substrate and said border portions being formed of a thermoplastic resistant to electrolyte and capable of being filled, said substrate being filled with electrically conductive material formed of finely divided vitreous carbon leaving said border portions nonconductive, an active electrode material overlying, supported by and in electrical contact with said substrate within said border portions, said border portions being proportioned so as to interfit with other similar plates leaving space for separators and electrolyte within the container periphery defined by the border portions.

5. The combination of claim 4 in which said vitreous carbon consists of particles sized from submicron up to −60 mesh, and the filled thermoplastic is from 40% to 60% carbon.

6. The combination of claim 4 in which said thermoplastic is selected from the group consisting of polyvinylidene fluoride and polyphenylene oxide.

7. A secondary storage battery comprising, in combination, a plurality of bipolar electrode-container plates stacked side-by-side, a plurality of separators with one separator being sandwiched between adjacent ones of each of said plates, electrolyte contained between adjacent ones of said plates and surrounding said separators, each of said plates having a planar electrically conductive substrate surrounded by nonconductive border portions, said border portions of said plates being joined to define a container for the battery with regions between said substrate and within said border portions containing said electrolyte and said separators, an active electrode material overlying, supported by and in electrical contact with said substrates of the plates, a layer of metal foil bonded to said substrate and interposed between said substrate and said active material, the border portions and substrate of said plates being integrally formed of thermoplastic, and the substrate of said plates being filled with electrically conductive material leaving said border portions nonconductive.

8. The combination of claim 7 in which said foil layer is a lead-antimony alloy.

9. The combination of claim 8 in which the content of antimony is said alloy is about 0.2% by weight.

10. A secondary storage battery comprising, in combination, a plurality or bipolar electrode-container plates stacked side-by-side, a plurality of separators with one separator being sandwiched between adjacent ones of each of said plates, electrolyte contained between adjacent ones of said plates and surrounding said separators, each of said plates having a planar electrically conductive substrate surrounded by nonconductive border portions, said border portions of said plates being joined to define a container for the battery with regions between said substrate and within said border portions containing said electrolyte and said separators, an active electrode material overlying, supported by and in electrical contact with said substrates of the plates, the border portions and substrate of said plates being integrally formed of thermoplastic, and the substrate of said plates being filled with electrically conductive material formed of finely divided vitreous carbon leaving said border portions nonconductive.

11. The combination of claim 10 in which said vitreous carbon consists of particles sized from submicron up to −60 mesh, and the filled thermoplastic is from 40% to 60% carbon.

12. The combination of claim 10 in which said thermoplastic is selected from the group consisting of polyvinylidene fluoride and polyphenylene oxide.

* * * * *